United States Patent Office 3,377,108
Patented Apr. 9, 1968

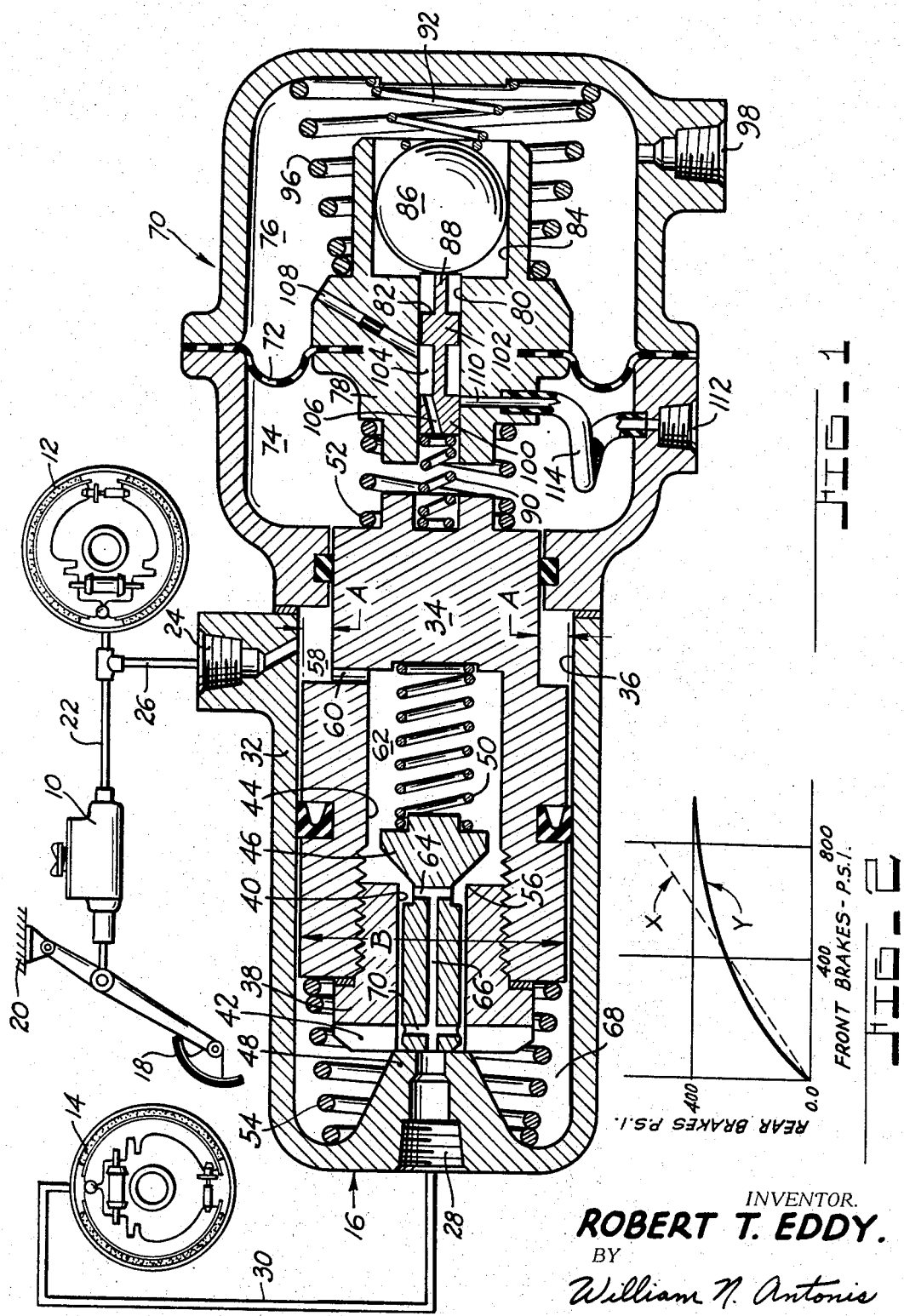

3,377,108
BRAKE PROPORTIONING DEVICE
Robert T. Eddy, South Bend, Ind., assignor to The Bendix Corporation, a corporation of Delaware
Filed Aug. 15, 1966, Ser. No. 572,612
4 Claims. (Cl. 303—24)

ABSTRACT OF THE DISCLOSURE

A brake proportioning device which is interposed between a master cylinder and the rear brakes for proportionally increasing the ratio of front braking pressure to rear braking pressure by reducing the rate of increase of the rear braking pressure without restricting the rate of increase of the front braking pressure. The proportioning device, which controls the pressure relationship between the front and rear brakes as a function of a piston load spring and master cylinder pressure, utilizes a power diaphragm and a deceleration responsive servo valve for reducing the load of the proportioning valve piston spring to achieve optimum brake proportioning.

---

It is well known in the automotive art that the effective braking effort of which a vehicle wheel is capable of tolerating prior to skidding is dependent upon the weight carried by that particular wheel and the coefficient of friction between the wheel and the road. It is also known that the proportion of the weight of the vehicle that is borne by the wheel of a given axle or a given pair of wheels does not remain static. As the vehicle is braked, a couple is developed between the front and rear wheels which results in a percentage of the weight of the car borne by the rear wheels being transferred to the front wheels. In other words, a shift of the vehicle weight from rear to front occurs when the vehicle is decelerated by means of the brakes. The amount of the weight transfer for a given vehicle is dependent upon the magnitude of the deceleration. Due to this weight shift, it is desirable to actuate the front and rear brakes at varying ratios if "optimum" braking is to be obtained. By "optimum" braking, it is meant that all of the potential tractive forces which the tires can exert against the road surface are being utilized.

Various devices have heretofore been proposed which are responsive to deceleration and which serve to limit the brake pressure applied to the rear wheels upon attainment of a predetermined rate of deceleration. The apparent object of such devices is to permit the greatest application of braking pressure to the front wheels before skidding will result at the rear wheels. Premature rear wheel skidding substantially reduces the coefficient of friction between the rear wheels and the ground, and can result in loss of control of the vehicle. When the rear wheels skid first they tend to overrun the front wheels and cause spin. It is therefore, highly beneficial to the maintenance of control of the vehicle during braking to assure that the rear wheels do not skid prior to the front wheels. On the other hand, the maximum braking effort of which both front and rear wheels are capable must be utilized if the vehicle is to be stopped within the shortest possible distance.

In spite of the various devices which have been proposed, most vehicles today still have a fixed ratio of actuation between the front and rear brakes. Such a fixed ratio results in optimum braking only at one rate of deceleration.

Accordingly, it is an object of this invention to provide a relatively inexpensive brake proportioning device which will provide a relatively close approximation of optimum braking at all times by varying the braking pressure ratio between the front and rear wheels.

Another object of this invention is to provide a brake proportioning device which is responsive to the deceleration of the vehicle and will automatically and continuously compensate therefor.

A further object of this invention is to control the pressure relationship between the front and rear brakes as a function of a piston load spring and master cylinder pressure.

A still further object of this invention is to utilize a power diaphragm and a deceleration responsive servo valve for reducing the load of the proportioning valve piston spring to achieve optimum brake proportioning.

Another object of this invention is to provide a proportioning device which self compensates for changes in vehicle load to achieve optimum braking.

The above and other objects and features of this invention will become apparent from the following description taken in connection with the accompanying drawing which forms a part of this disclosure and in which:

FIGURE 1 is a diagrammatic illustration of a motor vehicle braking system which incorporates a cross sectional view of a proportioning device constructed in accordance with the invention; and FIGURE 2 is a graph of ideal braking proportions contrasted to the usual fixed ratio proportioning provided in most automobiles today.

Referring to FIGURE 1 of the drawing it will be noted that the braking system shown includes a master cylinder 10 for providing braking pressure to the front axle brakes 12 and rear axle brakes 14, and a brake proportioning device 16 interposed between the master cylinder and the rear axle brakes.

The master cylinder, although shown as being of a familiar type may well be of the split system type wherein independent braking pressures are developed for the front brakes and rear brakes of the vehicle. In any event, the master cylinder shown is operated by a brake pedal 18 which is pivotally connected to the vehicle structure 20. Fluid from the master cylinder is conducted to the front brakes 12 via conduit 22 and to the inlet port 24 of the brake proportioning device 16 via conduit 26. The brake proportioning device has an outlet port 28 which communicates with the rear brakes 14 via conduit 30.

Referring specifically to the brake proportioning device it will be noted that it comprises a housing 32 in which the inlet and outlet ports 24 and 28 are located, and a stepped diameter piston 34 which is slidable in a stepped diameter bore 36 formed in the housing. A plug 38 having an axially extending bore 40 therein and radial slots 42 on the end thereof is threaded into a bore 44 formed within the large diameter portion of piston 34. A plunger type poppet valve 46 is located within bore 40 and is urged into abutment with stop 48 formed on the housing by spring 50.

Since spring 52 acting on the right end of the stepped diameter piston 34 has a higher load than spring 54 acting on the left end of the stepped diameter piston, the piston will be urged towards the left against the housing stop 48. With the piston in this position, the poppet valve 46, which is also in abutment with the stop 48, will be in an unseated position, that is, it will not be seated on valve seat 56 formed on the end of plug bore 40. With the proportioning valve components in this position it will be seen that upon initial application of the brake pedal 18 fluid flow from the master cylinder to the rear brakes will be through inlet port 24, a first variable volume chamber 58, passage 60, internal chamber 62, past valve seat 56, through radial passages 64 and axial passage 66 of the poppet valve, and through outlet port 28 to the rear brakes 14. Fluid flow will also flow into second variable volume chamber 68 through radial passages 70 of the poppet valve and radial slots 42 on the end of plug 38. Since the pressure in chambers 58 and 68 are initially equal and since the effective area A on which the pressure in chamber 58 is acting is less than the effective area B on which the pressure in chamber 68 is acting, at some predetermined pressure, depending on the load exerted by spring 52, the stepped diameter piston 34 will be caused to move towards the right until valve seat 56 contacts poppet valve 46. When this occurs no further fluid flow to the rear brakes is possible. However, any increase in the master cylinder fluid pressure output will also cause an increase in pressure in chamber 58 until, at some point, this increased pressure even though acting on a smaller effective area A will cause the piston to move in a leftward direction so as to move the valve seat 56 away from the poppet valve 46. With the poppet in an unseated position, an increase in rear brake pressure will be permitted until the pressure in chamber 68 reaches some value which will cause the piston once again to move towards the right so as to close the poppet valve. In this general fashion rear brake pressure fluid is continually being metered past the poppet valve seat as the brake applying pressure is increased. The pressures required to cause movement of the piston will vary as a function of the varying load exerted on the right end of the piston by spring 52.

In the graph shown in FIGURE 2, dotted line X represents a constant front to rear braking pressure ratio and solid line Y represents a variable (optimum) braking pressure ratio.

The purpose of the above described proportioning valve is to control the pressure relationship between the front and rear brakes as a function of the load exerted on the piston 34 by spring 52 and the master cylinder pressure so as to achieve the optimum braking pressure curve shown in the graph. In order to approach the ideal relationship between front and rear braking, it is necessary to increase the ratio of front brake pressure to rear brake pressure proportionally. This is accomplished by continuously reducing the load of spring 52 so that the front brake pressure will increase at a greater rate than the rear brake pressure. In order to vary the load of spring 52 as a function of vehicle deceleration, a regulating mechanism or servo mechanism, indicated generally by the numeral 70, is located within one end of the proportioning device. This mechanism includes a power diaphragm 72 which divides one end of the housing into two chambers 74 and 76. Suitably attached to the diaphragm is a floating valve body 78 having a small bore 80 therein for receiving a slidable spool valve member 82 and a large bore 84 for receiving a ball type inertia weight 86. Continuous contact between the valve stem 88 of the spool valve member and the weight 86 is maintained by valve spring 90 and anti-rattle spring 92. Spring 96 is located in chamber 76 and urges the floating valve body towards the left. Spring 52 is confined between piston 34 and the valve body. Vacuum chamber 76 is in continuous communication with a suitable vacuum source, such as the intake manifold of a vehicle, via vacuum port 98. It will be noted that the valve spool member includes two annular lands 100 and 102 having an annular groove 104 therebetween. A passage 106 located in annular land 100 permits communication between chamber 74 and the annular groove 104. Another passage 108 having a restricted orifice therein is located in the floating valve body for permitting communication between the vacuum chamber 76 and the annular groove 104. A still further passage 110, which is also located in the floating valve body, communicates with the atmosphere via port 112 and conduit 114. With no deceleration forces acting on the inertia weight 86, the spool valve member will be in a position whereby the vacuum chamber 76 will be in communication with chamber 74 via passage 106, annular groove 104, and restricted passage 108. With the pressure in both chambers being equalized there will, of course, be no movement of the floating valve body, and the load of spring 52 will remain constant. As the vehicle is decelerated, ball 86 will move in a leftward direction and will cause the spool 82 to move in the same direction against spring 90. Such movement of the spool valve will permit metering of atmospheric pressure to chamber 74 via port 112, conduit 114, passage 110, annular groove 104, and passage 106. Atmospheric pressure will have no effect on vacuum chamber 76 because of the restricted orifice in passage 108 and because land 102 will close off or tend to close off passage 108. Since the pressure in chamber 74 will be greater than in the vacuum chamber 76, the diaphragm and the valve body will be caused to move towards the right. Such movement will, of course, reduce the load exerted by spring 52 and thus permit the front brake pressure to increase at a greater rate than the rear brake pressure so as to achieve optimum brake proportioning.

From the foregoing it will be understood that this brake proportioning device is not only deceleration responsive, it is also load responsive. Thus, if the vehicle load is increased, a higher proportioning valve pressure will be required for a given deceleration. Furthermore, a corresponding increase in the piston load causes increased compression of the spring 52 between the piston and the valve body. The reduced distance between these two components also causes compression of the light servo valve spring 90. Since the metering spool valve is now balanced at a lower metered pressure, vehicle load compensation is accomplished.

The several practical advantages which result from this brake proportioning device are believed to be obvious from the above description, and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. Accordingly, I do not desire to be limited to the specific embodiment disclosed herein primarily for purposes of illustration, but instead desire protection falling within the scope of the appended claims.

Having thus described the various features of the invention what I claim as new and desire to secure by Letters Patent is:

1. In a braking system for a vehicle having front and rear wheel braking means, the combination of pressure generating means for applying a braking pressure to said front and rear braking means, a pressure-operated variable proportioning valve interposed between said pressure generating means and said rear braking means for proportionally increasing the ratio of front braking pressure to rear braking pressure by reducing the rate of increase of the rear braking pressure without restricting the rate of increase in the front braking pressure, preloaded means operatively connected to said proportioning valve for controlling the rear braking pressure, and regulating means for varying the preload of said last-mentioned means as a function of vehicle deceleration, said preloaded means being a preloaded spring located between said proportioning valve and said regulating means, and said regulating means including a housing having a pressure responsive diaphragm located therein and connected thereto, a floating valve body connected to said diaphragm and movable therewith, said valve body having a bore therein and being located at one end of and in contact with said preloaded spring, a valve member located in said bore for controlling the pressures acting on said diaphragm, said valve member having a first position wherein the pressures on opposite sides of said diaphragm are equal and a second position wherein said diaphragm is subjected to a pressure differential which causes movement thereof in a direction tending to reduce the preload of said spring, and an inertia weight operatively connected to said valve member, said weight being caused to move by deceleration forces acting thereon against said valve member to cause movement thereof towards said second position.

2. A system, as defined in claim 1, wherein said proportioning valve comprises a stepped diameter bore located in said housing, a stepped diameter piston located in said bore and being in contact with said preloaded spring, said piston dividing said stepped diameter bore into first and second variable volume chambers and having a first effective area exposed to the pressure in said first chamber which is less than a second effective area exposed to the pressure in said second chamber, conduit means for communicating said first chamber with said pressure generating means and said second chamber with said rear braking means, passage means located in said piston for communicating said first and second chambers, a poppet valve member located in said passage means and seatable on a valve seat formed therein and on said piston, said poppet valve having a stem in contact with said housing for maintaining said poppet valve in an unseated position, said piston upon the occurrence of a predetermined pressure in said first and second chambers being caused to move against said preloaded spring to a position wherein the valve seat contacts said poppet valve and prevents further communication between said first and second chambers.

3. A system, as defined in claim 2, wherein said housing includes a vacuum port connected to a vacuum pressure source for communicating vacuum directly to one side of said diaphragm and an atmospheric port connected to the atmosphere for communicating atmospheric pressure to the bore in said floating valve body, restricted passage means located in said valve body for communicating the vacuum pressure source with the bore in said valve body, said valve member in said bore having first and second annular lands with an annular groove therebetween, and passage means located in one of said lands for communicating said annular groove with the other side of said diaphragm, said annular groove being in communication with said vacuum port via said restricted passage means when said valve member is in said first position and being in communication with said atmospheric port when said valve member is in said second position.

4. A system, as defined in claim 3, wherein said inertia weight is a ball continuously in contact with said valve member.

References Cited

UNITED STATES PATENTS 3,317,251   5/1967   Hambling et al. _____ 303—24

MILTON BUCHLER, *Primary Examiner.*

FERGUS S. MIDDLETON, *Examiner.*

J. McLAUGHLIN, *Assistant Examiner.*